D. G. LITTLEFIELD.
Base Burning Stove.
No. 1,890. Reissued Feb. 28, 1865.
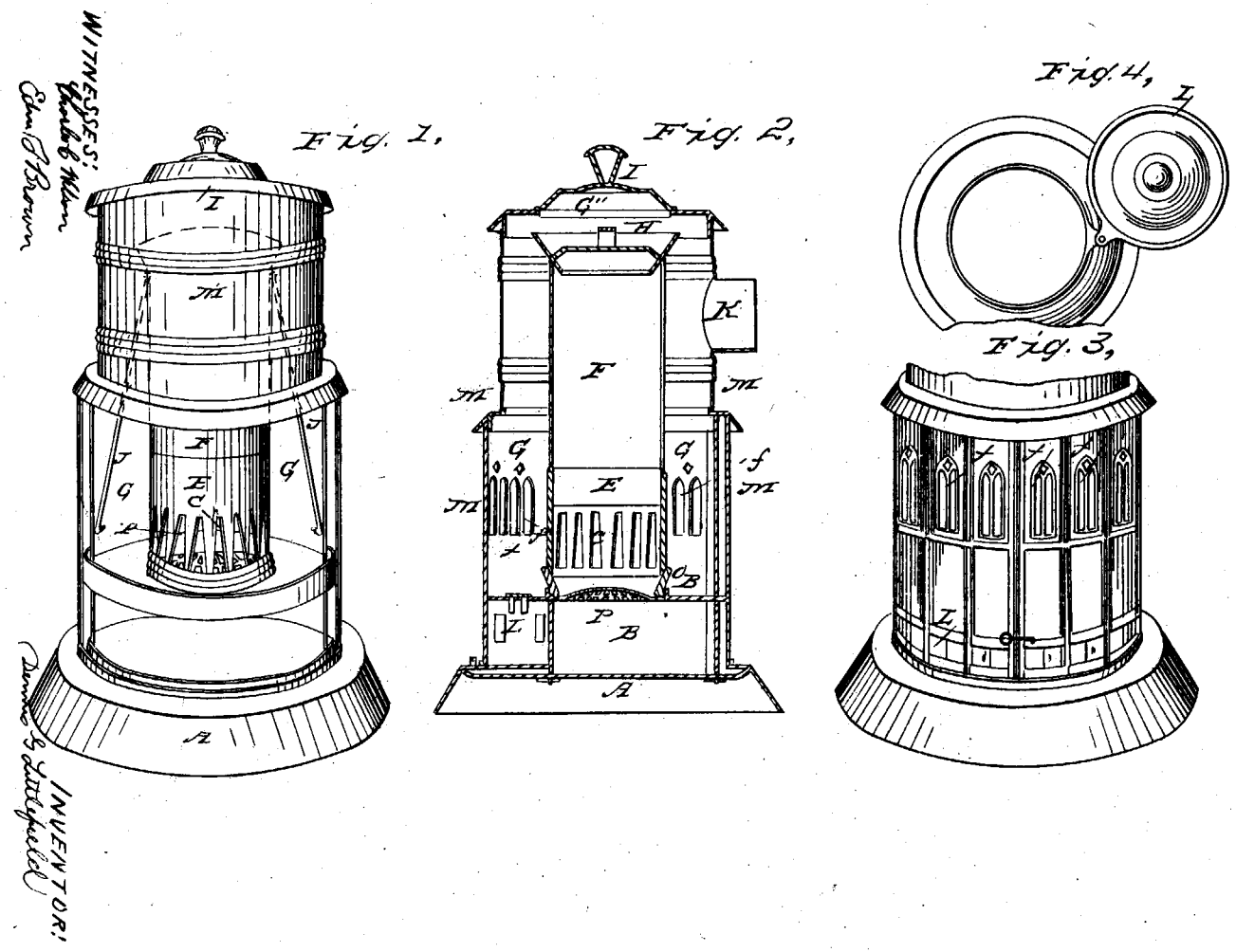
N. PETERS, Photo-Lithographer, Washington, D. C.

UNITED STATES PATENT OFFICE.

DENNIS G. LITTLEFIELD, OF ALBANY, NEW YORK.

BASE-BURNING STOVE.

Specification forming part of Letters Patent No. 10,448, dated January 24, 1854; Reissue No. 1,236, dated November 19, 1861; Reissue No, 1,332, dated August 26, 1862; Reissue No. 1,426, dated March 3, 1863; Reissue No. 1,813, dated November 8, 1864; Reissue No. 1,890, dated February 28, 1865.

*To all whom it may concern:*

Be it known that I, DENNIS G. LITTLEFIELD, of Albany, in the county of Albany and State of New York, have invented certain new and useful improvements in that class of stoves designed for the combustion of anthracite and other concentrated fuels, and which contains a magazine or fuel-supplying cylinder for the reception of a supply of fuel to be held in reserve; and I do hereby declare that the following is a full, clear, and exact description of my invention, reference being had to the accompanying drawings and the letters of reference marked thereon, the same forming a part of this specification, in which—

Figure 1 represents a perspective view of my improved stove, a portion of its exterior case being removed to show the fire-pot. Fig. 2 represents a vertical central section of Fig. 1, showing the arrangement of the various parts and their adaptation to each other. Fig. 3 represents an illuminating-case, showing the arrangement thereof when combined with a stove, in which a portion of its surface is concealed by being placed against a wall or otherwise.

Similar letters of reference indicate corresponding parts of the several figures.

The class of stoves to which my invention relates contains three principal parts—viz., a fire-pot or place where the fuel is burned, a fuel-supplying cylinder to contain a supply of reserve fuel, and a chamber or chambers to receive from the fire-pot the gaseous products of combustion and convey them to the chimney-flue.

As a mode or principle of operation the quantity of fuel ignited at any one time in this class of stoves is less than in the ordinary coal-burning stoves, but the fuel is consumed at a more elevated temperature, the intensity of heat and rapidity of combustion being regulated by an air-register at the base.

One serious practical objection to some of the above class of stoves as constructed prior to my invention was due to the fact that they could not be properly controlled in their action by the air-supply register at the base. From careful investigation and experiment I discovered that the difficulty and objections arose mainly in consequence of atmospheric air entering the stove through the opening in the top of the supply-chamber, it being a practical impossibility to make the cover fit air-tight and still be so applied as to be readily and easily removed whenever desired. This discovery accounted satisfactorily for the objectionable working of stoves thus constructed, which, when in operation, were attended with frequent "puffs," explosions, and generally with a premature ignition of the coal in the supply-chamber. In others the grate to uphold the fuel was made to form the bottom of the supply-chamber, and was permanently attached thereto, the lower part of the supply-chamber being made to serve the purpose of a combustion-chamber, the whole being placed in an outer covering connected with the smoke-flue. In this description of stoves the chamber containing the fuel being inclosed in an outer casing, atmospheric air could not easily reach the coal through the top of the supply-chamber, but as the chamber had to be lifted out and in to remove cinders and clean the stove at each time of building a fire, it was wholly unfitted for practical purposes, except in some few particular cases. Again, the lower part of the supply-chamber being used as a fire-pot, the fuel had to be burned at a comparatively low temperature in order to avoid the premature burning out and destruction of the supply-chamber, and hence it was that stoves of this latter construction were never designed for use, except for heating book-binders' tools, in which case only a gentle heat is required.

To overcome such defects and to produce a fuel-supplying cylinder-stove that shall be complete in its action and at all times safe and under perfect control is the object of my invention, the nature of which consists in the combination, adaptation, and permanent connection as a complete manufactured article or an individual thing, of the organic parts of a fuel-supplying cylinder-stove having its supplying-cylinder so adapted to the fire-pot or place where the fuel is burned, and to the chamber receiving the products of combustion therefrom, as to prevent atmospheric air entering said cylinder from the top when once in operation, whereby explosions and the premature ignition of the reserve fuel is entirely prevented, while at the same time the operation of cleaning out, replenishing, and building a fire in said stove is easy, convenient, and expeditious, thus making a practical and economical base-burning stove.

In order to enable those skilled in the art to which my invention belongs to make, construct, and use the same, I will proceed to describe it.

In the accompanying drawings, A is the base or bottom of the stove, above which is the ash-pit B. This is formed by an annular or other formed plate D, which is permanently secured to other parts or to the base of the stove. Said ash-pit is provided with a register, L, to regulate the supply of air to support combustion. Resting upon the plate D is a ring, O, which in this instance forms the lower part of a fire-pot, E, which may be made of any convenient and desirable form. The said ring is constructed with a flange extending upward far enough to receive the lower part of the fire-pot E, which is thus retained, together with ring O, in a central position as respects plate D by a flange upon the latter. The said fire-pot is constructed with vertical openings C around its entire circumference, in height about one-half its diameter, and made narrower at the top than at the bottom. This form tends to draw the point of active combustion downward, thereby keeping the hottest part of the fire at the base of the incandescent fuel. The fire-grate P at the bottom of the fire-pot rests upon the plate D on a line with the bottom of the ring O, and may be of the form represented or otherwise.

F is the fuel-suppling cylinder, placed over the fire-pot E, and is secured in place by stay-rods *j* J or other suitable device. It should be of sufficient capacity to contain a supply of unignited coal, upon which the cold fuel may be thrown without the disadvantage and inconvenience which would attend the introduction of fresh fuel into an intensely heated chamber. The fuel thus introduced falls upon the top of that already in the supply-cylinder and gradually descends as the portion in the place of combustion is consumed, and in its descent becomes gradually heated and prepared for a more perfect combustion. The said supplying-cylinder is provided with a cover, H, which must be kept closed when the stove is in operation, but which may be made to fit like an ordinary cover for stoves, so that a portion of the steam or light gases generated and thrown off by a rapid heating of the reserve fuel may escape from under said cover, as occasion may require, without establishing a current sufficient to cause the passage in that direction of the gaseous products of combustion from the fire-pot or place where the fuel is burned.

To effectually avoid all liability to premature ignition of the reserve fuel or danger of explosion, I inclose the cover-opening to the supplying-cylinder within a chamber, G″, which is either a part of, or if not should communicate directly with, the chamber G, receiving the products of combustion from the fire-pot, and also with the smoke or exit flue K—that is, the chamber or space above the top of the supply-chamber, and the chamber which receives the products of combustion, must both be exhausted by the exit or smoke flue, so that if any air enters the chamber G″, or circulates about the top of the supply-chamber, it will pass or be drawn directly to the exit-flue K, that containing a more perfect vacuous space than that which is created within the supplying-cylinder above the burning fuel.

I prefer to form the chamber G″ by extending the case M M, which forms the exterior of the chamber G, up so as to surround the top the supplying-cylinder, or at least so as to entirely inclose the cover-opening thereto, and to communicate with the chamber G and the smoke-flue K, as seen in Fig. 2. The said chamber G is provided with a cover and opening, I, through which the cover H may be removed to replenish the supplying-cylinder, or as other occasions may require.

When the stove is once put in operation, whatever space there may be within the cylinder above the supply-coal, and also the interstices between the supply-coal, is always filled with a volatile product more or less combustible, which is thrown off by the partially ignited fuel, so that at all times within the supplying-cylinder of my improved stove a volatile combustible is accumulating, and by its accumulation is forced downward to the burning fuel, thus greatly facilitating the perfect combustion thereof.

To build a fire, remove the cover I, through which the cover H may be reached and removed, place the requisite kindlings through the said openings I and H into the fire-pot, or place where the fuel is to be burned, close the cover I, leaving the cover H open. Open the air-register L, ignite the kindlings in the usual manner through the ash-pit, to which free access can be had by means of doors. Allow the said kindlings to burn up through the supplying-cylinder until the smoke has passed off and the chimney-flue has become sufficiently heated to establish a proper draft, after which the fuel-supplying cylinder may be filled with coal, and the openings I and H both closed, leaving the air-supply register L open to permit air to pass in at the base through the grate P to support combustion. The coal within the fire-pot, or place where the fuel burns, soon becomes ignited, while the reserve fuel contained in the supplying-cylinder is being prepared for a more perfect combustion, in connection or combination with gases arising therefrom, in the manner above described. The gaseous products of combustion pass to chamber G, and finally through the the smoke, or exhausting exit flue K, to the chimney.

Some of the parts of my improved stove represented in the accompanying drawings are more fully described and claimed in my Reissue Patents Nos. 1,814, 1,815, and 1,823; consequently a detailed description here is unnecessary.

What I claim under the patent as my invention is—

The combination of a reserve-fuel supplying cylinder, a separate fire-pot, a chamber to receive the products of combustion, and an exhausting exit-flue, substantially as and for the purposes described.

DENNIS G. LITTLEFIELD.

Witnesses:

JOS. W. RUSSELL,

WM. S. PADDOCK.